3,147,233
POLYVINYL COMPOUND AND TREATMENT INVOLVING SAME

Meyer Mendelsohn, New York, and Carl Horowitz, Brooklyn, N.Y., assignors to Yarney International Corp., New York, N.Y., a corporation of New York
No Drawing. Filed Apr. 18, 1960, Ser. No. 22,712
20 Claims. (Cl. 260—29.6)

This invention relates to a new composition of matter and a process for preparing the same. More particularly, it relates to a process and a composition of matter capable of improving the wettability of articles made from substantially hydrophobic synthetic materials, such as fibers and sheets or the like produced from polyamides (e.g., nylon).

In our copending application Ser. No. 851,881, filed November 9, 1959, we have disclosed and claimed a wetting agent prepared from polyvinyl alcohol and a polycarboxylic acid reacted in an aqueous medium for a sufficient time to produce a mono-ester. Although the composition is excellent for wetting synthetic hydrophobic materials, further improvement is still desirable.

It is, therefore, a primary object of this invention to provide a new composition of matter adapted more effectively to enhance the wettability of synthetic hydrophobic materials.

It is another object of the invention to provide a process for preparing the new composition of matter.

It is still another object of the invention to provide a new and efficient treatment for improving the wettability of articles made from substantially hydrophobic synthetic materials.

Further objects and advantages of the invention will be apparent from the description which follows hereafter.

It has now been found that the foregoing objects can be attained by combining a product which is a mono-ester of polyvinyl alcohol and a polycarboxylic acid with a quaternary amine prepared by the reaction of an epihalohydrin, an epichloride or an alkyl halide with a tertiary fatty amine.

The polyvinyl-alcohol mono-ester is prepared by reacting a polycarboxylic acid therewith and discontinuing the reaction at a stage prior to the onset of substantial cross-linking, i.e., while there are still available a large number of unreacted carboxyl groups in the ester formed. The degree of esterification is dependent upon a number of factors such as the number of moles of polycarboxylic acid originally present in relation to the moles of polyvinyl alcohol, the temperature employed in the process and the duration of the reaction. The degree of esterification may, of course, be determined by conventional tests. Although the number of moles of any particular acid employed is not critical, it is preferred that, for every mole of acid utilized, the polyvinyl alcohol be employed in a range of 0.1 to 10 moles.

Polycarboxylic acids suitable for use in the practice of the instant invention include aromatic as well as saturated and unsaturated aliphatic acids. Examples of these types of acids include aconitic, adipic, alginic, aspartic, azelaic, citric, decanedicarboxylic, diglycolic, glucuronic, glutamic, glutaric, itaconic, maleic, malic, malonic, naphthalic, oxalic, phthalic, pimelic, polyacrylic, sebacic, suberic, succinic, and tartaric acids and the like. The corresponding anhydrides can also be employed.

The mono-ester is prepared by mixing the reactants in hot water (about 90°–100° C.) and heating until the desired degree of esterification has taken place.

The quaternary amine is prepared by reacting a tertiary fatty amine with an epihalohydrin, an epichloride or an alkyl halide in the presence of an inorganic acid, preferably hydrochloric acid and in an alcoholic solvent. Here again, although the amounts of reactants are not critical, it is preferred that stoichiometric amounts be employed in the preparation of the quaternary amine.

Epihalohydrin and epihalides contemplated for use in the present invention are those having the general formula

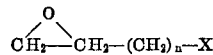

wherein X is a halogen selected from the group consisting of chlorine, bromine and iodine and $n$ is an integer from 1 to 18 inclusive. Representative epihalohydrins and epihalides coming within the above formula include epibromohydrin, epichlorohydrin and epiiodohydrin; epihalides, such as epiethyl chloride, epibutyl chloride, epipropyl chloride, epioctylchloride, epioctadecylchloride, epihexadecylchloride; and the bromo and iodo forms of these and similar compounds.

The alkyl halides which are utilized in preparing the quaternary amines employed in this invention are aliphatic halides containing from 1 to 18 carbon atoms in the alkyl group. Such compounds include methyl chloride, ethyl chloride, propyl chloride, butyl chloride, octyl chloride, octadecyl chloride, hexadecyl chloride, and the bromo and iodo forms of these and similar compounds.

The tertiary fatty amines reacted with the halides defined hereinabove are those having the general formula

wherein R is an alkyl group containing from 8 to 18 carbon atoms and R', R" are alkyl groups containing from 1 to 18 carbon atoms. Among the large number of compounds included in this formula there are octyldimethyl amine, nonyldiethyl amine, decyldipropyl amine, hexadecyldimethyl amine, octadecyldimethyl amine, soyamine, cocoamine and the like.

It is readily apparent, therefore, that a large variety of compounds can be utilized to prepare the quaternary amines useful in the practice of this invention. Regardless of what compounds coming within the above-defined formulae which are employed, the quaternary amines resulting from the reaction have one or the other of the following formulae:

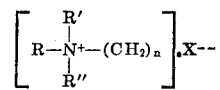

or

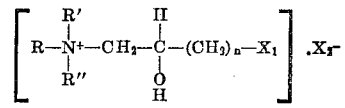

wherein R, R' and R" are as defined hereinabove, $n$ is defined as hereinabove, X and $X_1$ are selected from the group consisting of chlorine, bromine and iodine, and $X_2$ is the anionic group of an inorganic acid. The compounds thus obtained may be referred to as quaternary amines having at least one substituted group containing 8 or more carbon atoms in the carbon chain. It is to be noted that in carrying out the reaction, as mentioned hereinabove, any inorganic acid may be employed although hydrochloric acid is preferred. Accordingly, when a quaternary amine is formed from a tertiary fatty-acid amine and an epihalide, $X_2$ in the formula above results from the reaction of the acid employed which, although it is a catalyst, also gives up its anionic group, thereby forming a quaternary amine which contains the anionic group of the particular acid utilized in the reaction.

Representative quaternary amines coming within the generic formulae given above are octadecyldimethylethyl ammoniumchloride, hexadecyldimethylbutyl ammonium chloride, heptadecyldimethylethyl ammonium chloride, octyldiethylpropyl ammonium chloride, decyldimethylpropyl ammonium chloride, nonymethylethylbutyl ammonium chloride, octadecyldimethyl 2-hydroxy, 3-chloropropyl ammonium chloride, hexadecyldimethyl 2-hydroxy, 3-chlorobutyl ammonium chloride and the iodo and bromo forms of these and similar compounds.

In the production of the quaternary amine, the alcoholic solvent may be initially heated to about 65° C. whereupon the fatty-acid amine is added thereto along with the inorganic acid. Subsequently the halide is added to the mixture in incremental amounts and then the entire reaction mixture is refluxed at about 86° C. to form the quaternary amine. The refluxing period may last for about four hours. Naturally the time will vary considerably, depending upon the amount of reactants present. The alcohols preferably used as solvents include methyl, ethyl, propyl, and isoproyl alcohols, but any alcohol generally used as a solvent can be employed.

The two products thus prepared, i.e., the polyvinyl-alcohol ester and the quaternary amine, are subsequently dissolved in water to form an aqueous solution.

This solution can contain 0.1 to 20 percent by weight of of the two products, based on the total weight of the solution. It is preferred, however, that it contains from 5 to 15 percent. Furthermore, it is preferred that the amine constituent be present in at least an equal amount by weight with respect to the ester, based on the total weight of both components employed in the final formulation.

The materials treatable with the new wetting agent of this invention include, in particular, thermoplastic resins having terminal or internal molecular groups capable of condensing with the carboxyl groups of the wetting agent, e.g., such groups as amino, hydroxyl, phenol or mercapto groups and the like. These resins include polyamides and various polyesters. Nylon, in particular, has terminal amino groups which will react with such carboxyl groups to form an amide while liberating a molecule of water. Accordingly, the treatment of nylon and other reactable polymers with the new wetting agent of this invention involves the attachment of the reagent to the treated polymer whereby the properties of the polymer are affected. For example, the wettability and the permeability of porous objects made from synthetic polymers are increased by the present treatment and are not appreciably diminished even after repeated washing.

Of particular importance for the purposes of the present invention are the polyvinyl-alcohol esters of phthalic acid, succinic acid, sebacic acid, adipic acid and itaconic acid; the compositions formed by these polyvinyl alcohol esters with the following quaternary amines have been shown to impart excellent hydrophilic properties to normally hydrophobic synthetic resin materials such as polyamides: octadecyldimethyl-2-hydroxy, 3-chloropropyl-ammonium-chloride, hexadecyldimethyl-2-hydroxy, 3 - chloropropyl-ammonium-chloride, octadecyldimethyl - ethyl-ammonium-chloride, heptadecyldimethyl - ethyl - ammonium-iodide, and decyldimethylpropyl-ammonium-bromide.

The following examples are illustrative and not limitative. In the examples all parts and percents are by weight unless otherwise stated.

EXAMPLE I

A polyvinyl-alcohol/succinic-acid partial ester is prepared by dissolving 11.0 grams of polyvinyl alcohol and 25.0 grams of succinic anhydride in 100 cc. of water and heating for about 30 minutes to about 90° C. A completely clear solution of ester is obtained.

EXAMPLE II

A polyvinyl-alcohol/sebacic-acid partial ester is prepared by dissolving 13.0 grams of polyvinyl alcohol in 87 cc. of water and heating to a temperature of 80° to 90° C. on a water bath for three hours. Then 50.5 grams of sebacic acid dissolved at room temperature (about 25° C.) in 200 cc. of acetone is added to the polyvinyl-alcohol solution. The temperature of the mixture is held to about 56° C. until substantially all of the acetone is evaporated, the complete elimination of the acetone being indicated by a rise in temperature to about 70° C. The residue is a clear solution of polyvinyl-alcohol/sebacic-acid ester.

EXAMPLE III

A quaternary amine is prepared by heating 65 cc. of ethyl alcohol to 650° C. in a three-neck flask equipped with a stirrer, a thermometer and a reflux condenser. 54.0 grams of octadecyldimethyl amine and 6.6 grams of concentrated HCl are added to the alcohol. Subsequently, 51.1 grams of epichlorohydrin is added to the reaction mixture through a dropping funnel in incremental amounts over a 45-minute period. The entire reaction mixture is then refluxed at a temperature of 86° C. for four hours to form the quaternary amine. The alcohol is subsequently removed by distillation.

EXAMPLE IV 100 cc. of the solution produced in accordance with the procedure of Example II is heated to 90° C. and mixed with 300 cc. of hot water (80° C.). 40.0 grams of quaternary amine prepared according to Example III is then dissolved in this solution.

A piece of nylon fabric is dipped in this solution for 1 minute at 80° C., removed, squeezed and cured in an oven at 120° C. for five minutes. The fabric is then washed in cold water and dried at room temperature for about 24 hours. Another piece of fabric is treated in like manner with the polyvinyl-alcohol/sebacic-acid partial ester. Next, the wettability of the treated fabrics is determined and the values obtained are compared to each other and to those for an untreated piece of nylon. Wettability is determined by the technique of the American Association of Textile Chemists and Colorists as described on page 125 of the 1955 Technical Manual and Yearbook of the AATCC, Tentative Test Method 39–52. In accordance with the practice of this method, one observes the time required for the disappearance of a drop of water placed on the fabric. The results of the tests on the treated fabrics and on a control sample appear in the following table:

Table I

|  | Control | Polyvinyl-alcohol/sebacic-acid ester, sec. | Combined ester and amine, sec. |
| --- | --- | --- | --- |
| Wetting in seconds | No wetting at all. | 420 | 15 |

EXAMPLE V

The ester of Example I is diluted with 300 cc. of hot (80° C.) water and supplemented with 40.0 grams of quaternary amine from Example III.

Tests such as those described in the preceding example are made on a woven nylon fabric similar to that in electrochemical batteries as inter-electrode separators. The results of the test are set forth in the following table:

Table II

|  | Control | Polyvinyl-alcohol/sebacic-acid ester, sec. | Combined ester and amine, sec. |
| --- | --- | --- | --- |
| Wetting in seconds | No wetting at all. | 360 | 20 |

Like results were obtained with compositions which were similar to those in the examples but contained various of the other polycarboxylic acids, fatty-acid amines and inorganic acids, for example, sulfuric acid, as reactants in the reaction mixture.

The new compositions of this invention present many advantages which are applicable to a large number of fields. For example, apparel manufactured from fabrics of hydrophobic synthetic polymers when treated with the new agents of this invention are more comfortable when worn since body moisture is readily absorbed. Nylon bristles for use in paint brushes treated with the new compositions hold more paint and do not split open at the tips of the bristles after prolonged use. Bristles for toothbrushes treated with the new compositions result in a brush that is less stiff and more comfortable to use. Numerous other advantages of the instant invention will be readily apparent to those skilled in the art.

It is to be understood that the invention is not to be limited except as defined in the appended claims and many modifications and embodiments of this invention may be made without departing from the spirit and scope thereof.

We claim:

1. A new composition of matter comprising a polyvinyl-alcohol monoester of a polycarboxylic acid, said ester having unesterified carboxyl groups, and a quaternary amine selected from the group consisting of quaternary amines having the general formulae:

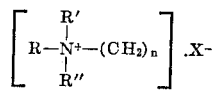

and

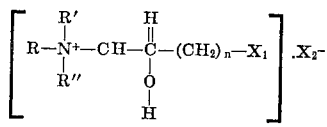

wherein X and $X_1$ are selected from the group consisting of chlorine, bromine and iodine, $X_2$ is the anionic group of an inorganic acid, R is an alkyl group containing from 8–18 carbon atoms, R' and R" are alkyl groups containing from 1 to 18 carbon atoms and $n$ is an integer from 1 to 18, dissolved in aqueous solution, the total amount of said ester and said amine being in a range of 0.1 to 20.0 percent, by weight, of the total weight of the solution, the molar ratio of said polycarboxylic acid to the polyvinyl alcohol in said polyvinyl-alcohol ester being in the range of about 0.1 to 10 moles of polyvinyl alcohol per mole of acid, said ester and said amine being present in quantities of essentially the identical order of magnitude in said solution.

2. A new compostion of matter comprising a polyvinyl-alcohol monoester of a polycarboxylic acid, said ester having unesterified carboxyl groups, and a quaternary amine selected from the group consisting of quaternary amines having the general formulae:

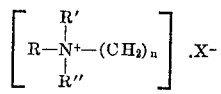

and

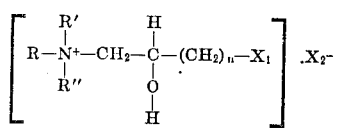

wherein X and $X_1$ are selected from the group consisting of chlorine, bromine and iodine, $X_2$ is the anionic group of an inorganic acid, R is an alkyl group containing from 8 to 18 carbon atoms, R' and R" are alkyl groups containing from 1 to 18 carbon atoms and $n$ is an integer from 1 to 18, dissolved in aqueous solution, the total amount of said ester and said amine being in a range of 0.1 to 20.0 percent, by weight, of the total weight of the solution, the molar ratio of the polyvinyl alcohol in said polyvinyl-alcohol ester being in the range of about 0.1 to 10 moles of polyvinyl alcohol per mole of acid, said ester and said amine being present in substantially equal amounts by weight in said solution.

3. A new composition of matter as defined in claim 2 wherein the polycarboxylic acid is phthalic acid.

4. A new composition of matter as defined in claim 2 wherein the polycarboxylic acid is succinic acid.

5. A new composition of matter as defined in claim 2, wherein the polycarboxylic acid is sebacic acid.

6. A new composition of matter as defined in claim 2 wherein the polycarboxylic acid is adipic acid.

7. A new composition of matter as defined in claim 2 wherein the polycarboxylic acid is itaconic acid.

8. A new composition of matter as defined in claim 2, wherein the quaternary amine is octadecyldimethyl-2-hydroxy, 3-chloropropyl-ammonium-chloride.

9. A new composition of matter as defined in claim 2, wherein the quaternary amine is hexadecyldimethyl-2-hydroxy, 3-chloropropyl-ammonium-chloride.

10. A new composition of matter as defined in claim 2, wherein the quaternary amine is octadecyldimethyl-ethyl-ammonium-chloride.

11. A new composition of matter as defined in claim 2, wherein the quaternary amine is heptadecyldimethyl-ethyl-ammonium-iodide.

12. A new composition of matter as defined in claim 2, wherein the quaternary amine is decyldimethylpropyl-ammonium-bromide.

13. A process for preparing a new composition of matter comprising the steps of mixing in aqueous solution a polyvinyl-alcohol ester of a polycarboxylic acid, said ester having unesterified carboxyl groups and a quaternary amine selected from the group consisting of quaternary amines having the general formulae:

$$\left[ R-\underset{\underset{R''}{|}}{\overset{\overset{R'}{|}}{N^+}}-(CH_2)_n \right].X^-$$

and $$\left[ R-\underset{\underset{R''}{|}}{\overset{\overset{R'}{|}}{N^+}}-CH_2-\underset{\underset{H}{|}}{\overset{\overset{H}{|}}{C}}-(CH_2)_n-X_1 \right].X_2^-$$

wherein X and $X_1$ are selected from the group which consists of chlorine, bromine and iodine, $X_2$ is the anionic group of an inorganic acid, R is an alkyl group containing from 8 to 18 carbon atoms, R' and R" are alkyl groups containing from 1 to 18 carbon atoms and $n$ is an integer from 1 to 18, and heating the mixture at a temperature in the range of substantially 80° C. to the boiling point of the mixture to form a homogeneous solution, the molar ratio of said polycarboxylic acid to the polyvinyl alcohol in said polyvinyl-alcohol ester being in the range of about 0.1 to 10 moles of polyvinyl alcohol per mole of acid, said ester and said amine being present in an amount of 0.1 to 20% by weight of said solution and in quantities of essentially identical order of magnitude.

14. A manufactured article comprised of substantially hydrophobic polymeric resin material having functional groups selected from the class consisting of amino, hydroxy, phenol and mercapto groups, rendered wettable by reaction with the composition prepared by the process of claim 13.

15. A manufactured article according to claim 14 wherein said material is in the form of a sheet.

16. A manufactured article as defined in claim 14 wherein the substantially hydrophobic resin material is a polyamide.

17. The process as defined in claim 13 wherein the ester is polyvinyl sebacate.

18. The process as defined in claim 13 wherein the ester is polyvinyl succinate.

19. The process as defined in claim 13 wherein the quaternary amine is octadecyldimethyl-2-hydroxy,3-chloropropyl-ammonium-chloride.

20. The process as defined in claim 13 wherein the quaternary amine is hexadecyldimethyl-2-hydroxy,3-chloropropyl-ammonium-chloride.

References Cited in the file of this patent
UNITED STATES PATENTS

| | | |
|---|---|---|
| 2,145,345 | Dreyfus | Jan. 31, 1939 |
| 2,271,468 | Watkins | Jan. 27, 1942 |
| 2,292,921 | Bock | Aug. 11, 1942 |
| 2,304,252 | Hager et al. | Dec. 8, 1942 |
| 2,484,415 | Malm et al. | Oct. 11, 1949 |